(12) United States Patent
Herrick et al.

(10) Patent No.: US 12,439,102 B2
(45) Date of Patent: Oct. 7, 2025

(54) TRICK MODE OPERATION WITH MULTIPLE VIDEO STREAMS

(71) Applicant: Avago Technologies International Sales Pte. Limited, Singapore (SG)

(72) Inventors: Jason W. Herrick, San Jose, CA (US); Daniel William English, Andover, MA (US); Wade K. Wan, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 17/826,862

(22) Filed: May 27, 2022

(65) Prior Publication Data

US 2022/0295125 A1    Sep. 15, 2022

Related U.S. Application Data

(60) Division of application No. 16/265,870, filed on Feb. 1, 2019, now Pat. No. 11,350,140, which is a continuation of application No. 15/050,120, filed on Feb. 22, 2016, now Pat. No. 10,205,975.

(60) Provisional application No. 62/281,094, filed on Jan. 20, 2016.

(51) Int. Cl.
| | |
|---|---|
| H04N 21/234 | (2011.01) |
| H04N 21/2343 | (2011.01) |
| H04N 21/2387 | (2011.01) |
| H04N 21/462 | (2011.01) |
| H04N 21/472 | (2011.01) |

(52) U.S. Cl.
CPC ........ *H04N 21/23424* (2013.01); *H04N 21/23439* (2013.01); *H04N 21/2387* (2013.01); *H04N 21/4621* (2013.01); *H04N 21/47217* (2013.01)

(58) Field of Classification Search
CPC ....... H04N 21/23424; H04N 21/23439; H04N 21/2387; H04N 21/4621; H04N 21/47217
USPC .......................................... 386/343
See application file for complete search history.

(56) References Cited

U.S. PATENT DOCUMENTS

| | | | |
|---|---|---|---|
| 5,576,902 A | 11/1996 | Lane et al. | |
| 6,272,566 B1 * | 8/2001 | Craft | H04N 21/426 710/53 |
| 7,639,924 B2 | 12/2009 | Roelens | |
| 7,778,372 B2 * | 8/2010 | Takashima | H04N 21/23406 375/372 |

(Continued)

OTHER PUBLICATIONS

Non-Final Office Action on U.S. Appl. No. 16/265,870 DTD Jul. 21, 2021.

(Continued)

*Primary Examiner* — Helen Shibru
(74) *Attorney, Agent, or Firm* — Foley & Lardner LLP (57) ABSTRACT

Systems, methods and apparatuses for handling trick mode operation using multiple video streams are provided. A media server presents a first video stream having a first level of a video characteristic for display. The media server, in response to receiving a first command, presents a second video stream having a second level of the video characteristic for display while stopping presenting the first video stream for display based on a determination determined using the first level of the video characteristic and the second level of the video characteristic. The first video stream and the second video stream are directed to the same video content.

26 Claims, 8 Drawing Sheets

(56) References Cited

U.S. PATENT DOCUMENTS

| | | | |
|---|---|---|---|
| 7,860,375 B2 | 12/2010 | Carlsgaard et al. | |
| 8,402,494 B1* | 3/2013 | Hu | H04N 21/40 |
| | | | 725/74 |
| 8,966,551 B2* | 2/2015 | VerSteeg | H04N 21/234381 |
| | | | 725/87 |
| 9,014,547 B2 | 4/2015 | Terunuma | |
| 9,137,477 B2 | 9/2015 | Gautier et al. | |
| 9,241,166 B2* | 1/2016 | Konda | H04N 19/164 |
| 9,467,741 B2 | 10/2016 | Laksono | |
| 9,510,029 B2* | 11/2016 | Hurst | H04N 5/765 |
| 9,584,832 B2* | 2/2017 | Corey | H04N 19/132 |
| 9,762,966 B2* | 9/2017 | Liu | H04N 21/42607 |
| 9,838,651 B2* | 12/2017 | Bateman | H04N 23/64 |
| 11,350,140 B2* | 5/2022 | Herrick | H04N 21/23439 |
| 2001/0008577 A1 | 7/2001 | Yamada et al. | |
| 2001/0022887 A1 | 9/2001 | Lee | |
| 2006/0083315 A1 | 4/2006 | Sato et al. | |
| 2006/0218607 A1* | 9/2006 | Hodzic | H04N 7/1675 |
| | | | 725/100 |
| 2007/0143493 A1 | 6/2007 | Mullig et al. | |
| 2008/0155586 A1 | 6/2008 | Yang et al. | |
| 2008/0285660 A1 | 11/2008 | Raines et al. | |
| 2009/0169181 A1 | 7/2009 | Priyadarshi et al. | |
| 2009/0262252 A1 | 10/2009 | Wan | |
| 2009/0300676 A1 | 12/2009 | Harter, Jr. | |
| 2010/0008648 A1 | 1/2010 | Sivakumar et al. | |
| 2010/0166079 A1 | 7/2010 | Goel | |
| 2011/0074922 A1 | 3/2011 | Chen et al. | |
| 2011/0217025 A1 | 9/2011 | Begen et al. | |
| 2012/0086773 A1 | 4/2012 | Park et al. | |
| 2013/0219442 A1* | 8/2013 | Hu | H04N 5/268 |
| | | | 725/100 |
| 2013/0251333 A1 | 9/2013 | Berbecel et al. | |
| 2014/0320740 A1 | 10/2014 | Wan et al. | |
| 2016/0007053 A1 | 1/2016 | Mao | |
| 2016/0360217 A1 | 12/2016 | Wan et al. | |
| 2017/0155907 A1 | 6/2017 | Baeza et al. | |

OTHER PUBLICATIONS

Notice of Allowance on U.S. Appl. No. 16/265,870 DTD Feb. 2, 2022.

* cited by examiner

TRICK MODE OPERATION WITH MULTIPLE VIDEO STREAMS

CROSS-REFERENCE TO RELATED APPLICATIONS

This application is a divisional of and claims priority to and the benefit of U.S. patent application Ser. No. 16/265,870, entitled "Trick Mode Operations With Multiple Video Streams," filed Feb. 1, 2019, which itself is a continuation of and claims priority to and the benefit of U.S. patent application Ser. No. 15/050,120, entitled "Trick-Mode Operation with Multiple Video Streams," filed Feb. 22, 2016, which claims priority to and the benefit of U.S. Provisional Application No. 62/281,094, entitled "Trick-Mode Operation with Multiple Video Streams," filed Jan. 20, 2016, the contents of all of which are incorporated herein by reference in their entirety for all purposes.

BACKGROUND

In digital video systems including digital video recorders, trick mode operations refer to functions, for example fast forward, pause, and rewind, that generally mimic the visual feedback given during fast forward, pause, and rewind operations provided by analog systems such as videocassette recorders.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various implementations of the methods and systems are set forth in the accompanying drawings and the description below.

DETAILED DESCRIPTION

Following below are more detailed descriptions of various concepts related to, and implementations of, methods, apparatuses, and systems of handling trick mode operations. Before turning to the more detailed descriptions and figures, which illustrate the exemplary implementations in detail, it should be understood that the application is not limited to the details or methodology set forth in the descriptions or illustrated in the figures. It should also be understood that the terminology is for the purpose of description only and should not be regarded as limiting.

The present disclosure is directed generally to systems and methods of handling trick mode operations, such as fast forward operations, for video streams having higher resolution (e.g., high resolution 4K/2160p or 8K/4320p streams) or other video characteristics that demand greater decoder performance or decoder power. A fast forward operation allows a user to play the video at a higher rate of speed than that of normal play. For example, during a two times ("2×") fast forward operation, the video can be played at twice the speed than that of normal play. Accordingly, a video decoder may have to operate at twice the speed than the speed in normal play. In other words, the video decoder may have to decode twice the amount of video data during a 2× fast forward operation. In general, the speed of play is a function of picture resolution, frame rate, bit rate, and bit precision, among other video characteristics. For example, a 2160p stream has 4 times the pixels as that of a 1080p stream. Thus, the decoder performance required for decoding the 2160p stream during a fast forward operation is much greater than that of the 1080p stream. Furthermore, trick play modes are devised to visually simulate the effects of faster display but often fall short due to the methods employed. For example, some methods include only displaying reference frames that may result in a jerky display or other issues.

The systems and methods described herein can seamlessly handle trick mode operations for video streams having high resolution or other video characteristics that demand greater decoder performance or decoder power (and/or other hardware resource) and can seamlessly transition into and transition out of the trick mode operations. In some implementations, the systems and methods described herein can obtain a second video stream that is directed to (or has) the same video content as a first video stream, but has a lower level of a video characteristic (e.g., resolution, frame rate, bit precision, bit rate, chroma subsampling) than the first video stream. For example, the second video stream can have a lower resolution, a lower frame rate, a lower bit precision, a lower bit rate, or a lower chroma subsampling than the first video stream.

In some implementations, the systems and methods described herein can decode the two video streams simultaneously. During the normal play, for example, the video stream with the higher resolution can be displayed. Continuing with the example, when a fast forward command is received, in one implementation, the systems and methods can stop decoding the higher resolution video stream, start to decode the lower resolution video stream at the fast forward (e.g., 1.5×, 2×, 3×, etc.) rate, and switch to display the lower resolution video stream during the fast forward operation.

In some implementations, when a command of stopping the fast forward operation is received, the systems and methods can switch back to display the higher resolution video stream. In one implementation, when a command of stopping the fast forward operation is received, the systems and methods can check if the higher resolution video stream is at a transition point. For example, when the command of stopping the fast forward operation is received, the systems and methods start to feed the higher resolution video stream into the decoder which identifies whether the higher resolution video stream is at the transition point. If the higher resolution video stream is at the transition point, the systems and methods can start to decode the higher resolution video stream at the normal play rate and display the decoded higher resolution video stream. On the other hand, if the higher resolution video stream is not at the transition point, the systems and methods can wait until the higher resolution video stream reaches the next transition point. When the next transition point is reached, the systems and methods can start to decode the higher resolution video stream at the normal play rate and display the decoded higher resolution video stream.

Figure 1:
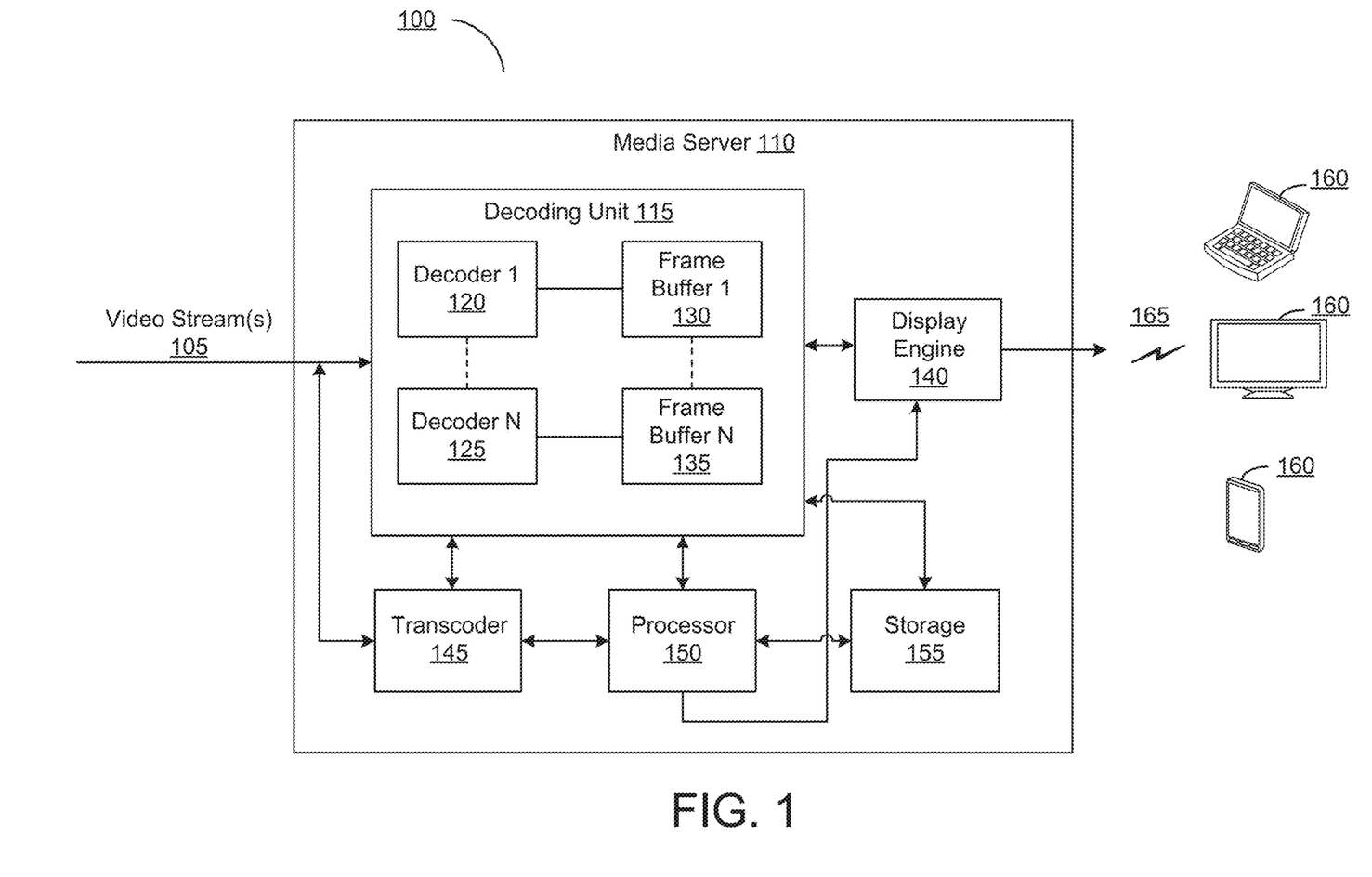
FIG. 1 is a block diagram depicting an example system of performing trick mode operation, according to an illustrative implementation.

FIG. 1 is a block diagram depicting an example system 100 of performing trick mode operation. The system 100 includes a media server 110 and a client device 160. Examples of the media server 110 include a set-top box (STB) that can perform digital video recorder functions, a home or enterprise gateway, a server, a computer, a work station, etc. Examples of a client device 160 include a television, a computer monitor, a mobile computer, a projector, a tablet, or a hand-held user device (e.g., smart phone), etc. The media server 110 is configured to output audio, video, program information, and other data to client device 160 in some implementations. For example, the media server 110 can provide video data for display on the screen of the client device 160.

In some implementations, the media server 110 and the client device 160 communicate with each other via connection 165. The connection 165 can be wired connection or wireless network connection. For example, the connection 165 can be coaxial cable, BNC cable, fiber optic cable, composite cable, s-video, DVI, HDMI, component, VGA, DisplayPort, or other audio and video transfer technologies. For example, the wireless network connection can be a wireless local area network (WLAN) and can use Wi-Fi in any of its various standards. In other implementations, the media server 110 and the client device 160 is one device. For example, the media server 110 includes a display for displaying the video processed by the media server 110. In some implementations, the media server 110 can be implemented as a single chip or a system on chip (SOC).

In some implementations, the media server 110 includes a decoding unit 115, a display engine 140, a transcoder 145, a processor 150, and a storage 155. The decoding unit 115 includes one or more decoders 120, 125 and one or more frame buffers 130, 135. The decoders 120, 125 can be configured to decode compressed video streams, such as video streams 105, and generate decoded video frames. The frame buffers 130 and 135 can be configured to store the decoded frames. Although the decoding unit 115 in FIG. 1 shows two decoders 120, 125 and two buffers 130 and 135, the decoding unit 115 can include only one decoder and one frame buffer, or three, four, or more decoders and corresponding number of frame buffers in some implementations. The decoders 120, 125 can be separate hardware video decoders or can represent decoding operations on a single hardware video decoder in some implementations. The display engine 140 can be configured to select decoded frames stored in the frame buffers 130, 135 for display. The transcoder 145 can represent one or more transcoders. The transcoder 145 can be a separate component on the media server 110 or can be part of the decoding unit 115 or the decoders 120, 125. The transcoder 145 is described in more detail herein below. The processor 150 can be one or more microprocessors, CPUs, application specific integrated circuits (ASICs) and/or one or more other integrated circuits. The processor 150 can execute instructions stored in non-transitory computer-readable media for performing functions described herein. The storage 155 can include disk drive, dynamic random access memory (DRAM), flash memory, memory registers or other types of volatile or non-volatile fast memory. The media server 110 can include other components not shown in FIG. 1. For example, the media server 110 can include additional buffers (e.g., input buffers for storing compressed video frames before they are decoded by the decoders), network interfaces, controllers, memory, input and output devices, conditional access components, and other components for audio/video/data processing.

The media server 110 can obtain a plurality of video streams directed to the same video content. In some implementations, the media server 110 receives a number (e.g., two or more) of video streams 105 from a source (e.g., via simulcast). The video streams 105 can be compressed or uncompressed video streams. The source can be a content provider, a service provider, a headend, a video camera, or a storage device, etc. For example, the video streams 105 can include a number (e.g., two or more) of video streams directed to the same video content (e.g., same program, same channel, etc.) but having different resolutions (e.g., 2160p resolution vs. 1080p resolution), frame rates (e.g., 60 fps vs. 30 fps), bit precisions (e.g., 10 bits vs. 8 bits), or other video characteristics. The video streams 105 can be received via a cable network, a satellite, an internet, a cellular network, or other networks. For example, the cable network can run over coaxial cable, BNC cable, Ethernet cable (such as Category 5, 5e, 6, and 7 wire), fiber optic cable or other high data transfer technologies. The cable network can be connected to a local or remote satellite dish.

In some implementations, the media server 110 can generate additional video streams from a received video stream. For example, the transcoder 145 of the media server 110 can generate one or more additional video streams based on a video stream 105 received from a source. In some implementations, the transcoder 145 can generate additional video streams when the received video stream enters the media server 110. For instance, the received video stream 105 can be a 4K Ultra High Definition (UHD) (e.g., 3,840×2,160 pixels or 2160p) video stream. The transcoder 145 can take the 4K/2160p video stream as input, decode it, and re-encode it to generate a lower resolution (e.g., 1080p, 720p, etc.) video stream. In this example, the video content between the 2160p video stream and the 1080p or 720p video stream are the same, but the resolutions are different. In another example, the transcoder 145 can take a video stream with other video characteristics (e.g., frame rate, bit precision, bit rate, chroma subsampling) and generate one or more video streams having lower level of the video characteristics (e.g., lower frame rate, lower bit precision, lower bit rate, lower chroma subsampling).

In some implementations, the media server 110 can simultaneously decode two or more video streams directed to the same video content, but having different levels or versions of video characteristics. For example, the decoder unit 115 can decode the two or more video streams having the same video content, but different levels or versions of resolution (e.g., 4320p, 2160p, 1080p, 720p, 480p) simultaneously. In some implementations, each video stream can be decoded by a dedicated hardware video decoder. In other implementations, each video stream can be decoded by a separate decoding operation running on the same hardware video decoder. In some implementations, the processor 150 can execute instructions stored in the storage 155 or another non-transitory computer-readable medium to perform decoding operations.

Figure 2A:
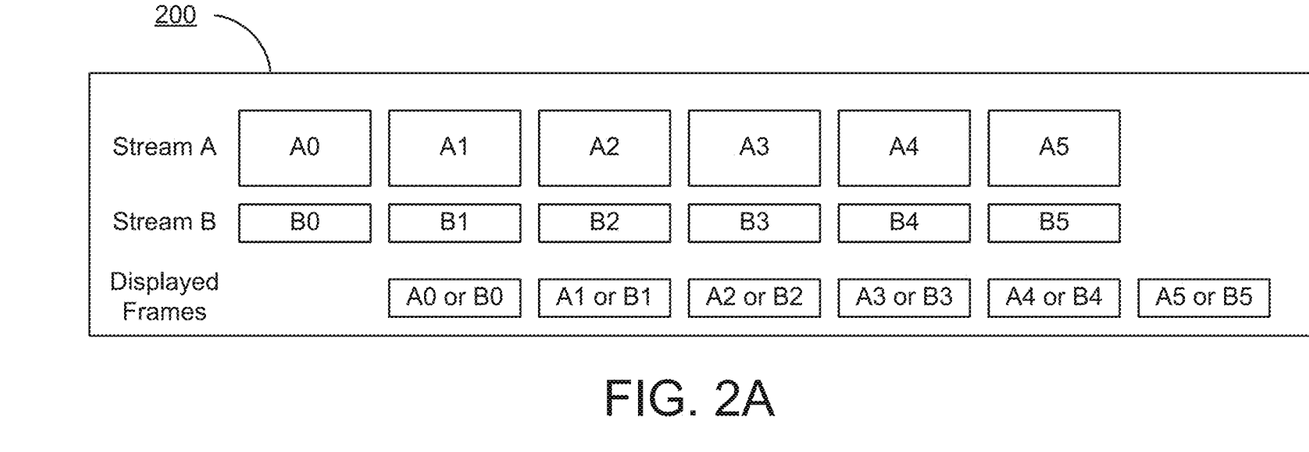
FIG. 2A is a block diagram depicting an example operation of simultaneously decoding two video streams, according to an illustrative implementation.
Figure 2B:
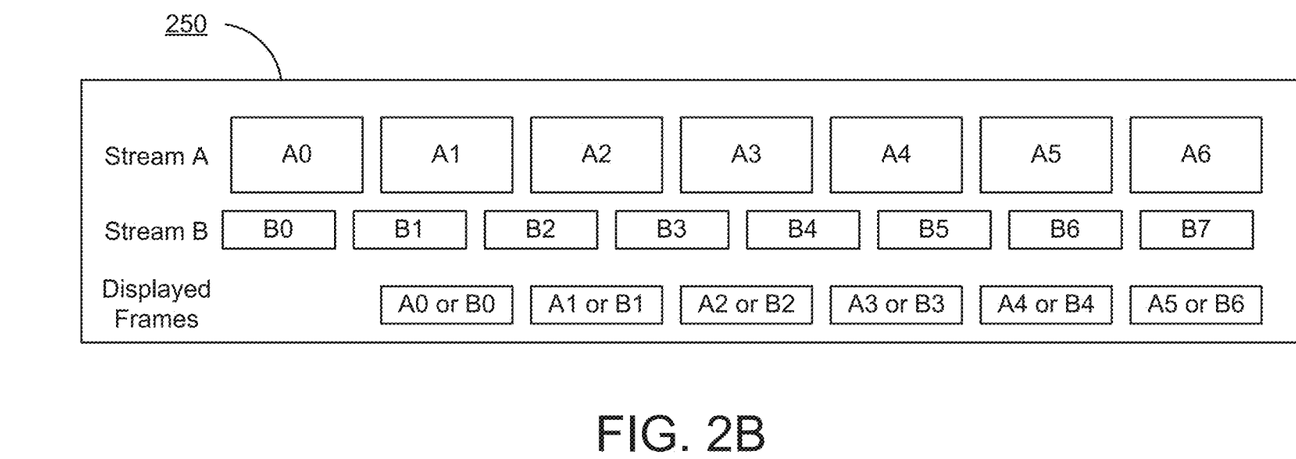
FIG. 2B is a block diagram depicting an example operation of simultaneously decoding two video streams, according to an illustrative implementation.

FIGS. 2A and 2B are block diagrams depicting example operations 200, 250 of simultaneously decoding two video streams. Referring to FIG. 2A, a stream A can represent a first video stream having a first level of a video characteristic and a stream B can represent a second video stream having a second level of the video characteristic. For example, the stream A can be a 2160p resolution video stream and the stream B can be a 1080p resolution video stream. Both the stream A and the stream B are directed to the same video content. As described herein above, the stream A and the stream B can be received from a source via simulcast or one (or both) of the streams A and B can be generated by the transcoder 145 or from a local storage.

In some implementations, the decoder 120 can decode the stream A and the decoder 125 can decode the stream B at the same time. Each of the frames A0, A1, . . . , A5 can represent a decoded frame in stream A. Similarly, each of the frames B0, B1, . . . , B5 can represent a decoded frame in stream B. Frames A0, A1, . . . , A5 can be stored in frame buffer 130 and frames B0, B1, . . . , B5 can be stored in frame buffer 135. For illustrative purposes, the frames are arranged in a display order (e.g., the order the decoded frames being presented for display by the display engine). It should be understood that the orders of the frames as shown in "Stream A," "Stream B," and "Displayed Frames" in FIGS. 2A, 2B, 3A, 3B, 3C, 4A and 4B are for illustrative purposes only and are not limiting.

In some implementations, during a normal play, as the case in FIGS. 2A and 2B, both the streams A and B are decoded at a normal play rate. In some implementations, the media server 110 monitors the buffer 130 and the buffer 135 to keep the two streams synchronized with each other during the simultaneous decoding. For example, the media server 110 can check the presentation timestamps (PTS) of the corresponding frames in the two streams to see if they match or correspond with each other. In some implementations, the media server 110 can synchronize the two streams if the streams do not synchronize with each other. However, the two streams do not have to be one-to-one synchronous, as illustrated in FIG. 2B.

Referring to FIG. 2B, in some implementations, the decoded frames in streams A and B do not have to be one-to-one synchronous with each other. In these implementations, as long as the corresponding frames in the two streams are close to each other, the transition into the trick mode, which is described in relation to FIG. 3A, can be seamless.

Referring to FIGS. 1, 2A and 2B together, in some implementations, during each display period, the display engine 140 can select a frame from one of the frame buffers for display. For example, the display engine 140 can select frames of stream A (e.g., the 2160p resolution stream) stored in frame buffer 130 for display because stream A has a better video quality. However, the display engine can select frames of stream B (e.g., the 1080p resolution stream) stored in frame buffer 135 for display for some other reasons.

Figure 3A:
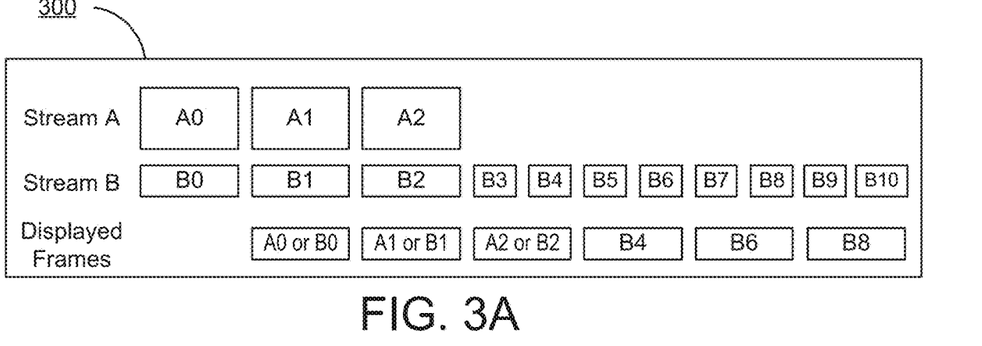
FIG. 3A is a block diagram depicting an example operation of transitioning into a trick mode operation, according to an illustrative implementation.

FIG. 3A is a block diagram depicting an example operation 300 of transitioning into a trick mode operation. In some implementations, when a trick mode command (e.g., a fast forward command) is received (e.g., from a remote control or other devices operated by a user), the media server 110 (FIG. 1) can determine whether to use stream A or stream B during the trick mode operation. In some implementations, the determination can be based on the capacity of the decoders and/or other hardware within the media server 110. For example, the media server 110 can determine that decoding stream A may require higher decoder performance or more decoder power than decoding stream B because, for example, stream A has a higher resolution, a higher frame rate, a higher bit precision, a higher bit rate, a higher chroma subsampling or other higher level of a video characteristic than stream B. For example, the media server 110 can determine that the decoder 120 may not be kept up during a certain trick mode operation (e.g., a 2× fast forward operation in which the decoder has to run twice the speed than during normal play). For example, the media server 110 can determine that using stream A during a trick mode operation may not be efficient or economic even if the decoder can keep up with the faster speed of operation.

Referring to FIG. 3A, in some implementations, responsive to receiving the trick mode command (e.g., a 2× fast forward command), based on the determination as described herein above, the media server 110 can stop decoding the stream A, change to decode the stream B from the normal play rate to the fast forward rate, and switch to present the stream B for display. For example, responsive to the trick mode command (e.g., a 2× fast forward command), the decoder 120 can stop decoding the stream A. As shown in FIG. 3A, the decoder decoding stream A (e.g., the decoder 120) stops generating decoded frames after the frame A2. However, the decoder decoding stream B (e.g., the decoder 125) keeps decoding the stream B and the decoding speed is changed to 2 times of the normal play rate. Further as shown in the example in FIG. 3A, the display engine 140 switches to select frames from the stream B stored in the frame buffer 135 for display. In these implementations, because two video streams are decoded simultaneously before a trick mode command is received, the transition into the trick mode operation can be seamless given the decoded frames from either the stream A or the stream B are ready for selection by the display engine 140 when the trick mode command is received. In some implementations where decoder 120 stops decoding stream A, it may be more efficient to still parse and discard the video frames in order to stay in synchronization with decoder 125 for the purposes of transitioning out of trick mode operation.

Figure 3B:
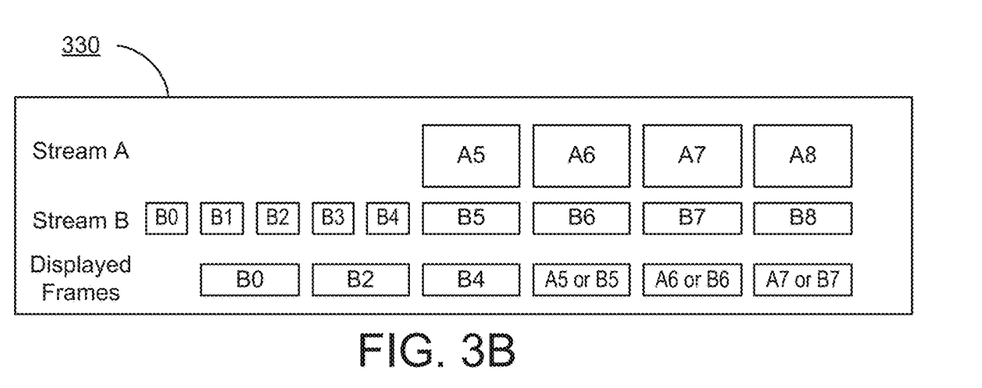
FIG. 3B is a block diagram depicting an example operation of transitioning out of a trick mode operation, according to an illustrative implementation.
Figure 3C:
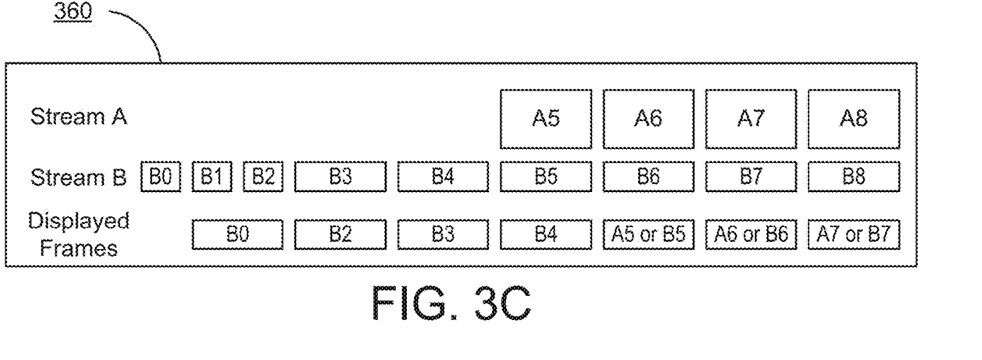
FIG. 3C is a block diagram depicting an example operation of transitioning out of a trick mode operation, according to an illustrative implementation.

FIGS. 3B and 3C are block diagrams depicting example operations 330, 360 of transitioning out of a trick mode operation. In some implementations, when a command to stop the trick mode operation (e.g., a fast forward operation) and resume the normal play is received (e.g., from a remote control or other devices operated by a user), the media server 110 can change to decode the currently playing video stream from the fast forward rate to the normal play rate. For example, referring to FIG. 3B, the decoder 125 can change to decode stream B from the fast forward rate to the normal play rate as shown in the transition between frame B4 and frame B5.

In some implementations, the media server 110 can determine whether a video stream is at a transition point. A transition point can be different in different coding standards, but in general, a transition point can be any point in the video stream where the decoder can effectively start to decode the frames. For example, a transition point can be an I-frame (intra-coded picture) or a reference frame in a video stream or in a group of pictures (GOP) within the video stream. In some implementations, when the command to stop the trick mode operation and resume the normal play is received, the media server 110 determines whether the stream A is at a transition point. For example, when the command to stop the trick mode operation and resume the normal play is received, the media server 110 starts to feed the stream A into the decoder 120 which identifies whether the stream A is at a transition point. If a transition point is identified, the media server 110 determines that the stream A is at a transition point. In some implementations, in response to determining that the stream A is at a transition point, the media server 110 can start to decode the stream A at the normal play rate and switch to display stream A which, for example, may have a better video quality. As shown in the example in FIG. 3B, once decoded frames from both streams A and B are available, the display engine can choose frames from either stream A or stream B for display.

In some implementations, in response to the stream A is not at a transition point, the media server 110 continues to display the stream B until the stream A is at a transition point. Referring to FIG. 3C, when the command to stop the trick mode command (e.g., a fast forward command) and resume the normal play is received, the stream A is not at a transition point in some implementations. The media server 110 continues to display frames from the stream B until a transition point in stream A is hit. For example, as shown in FIG. 3C, after the stream B is changed to be decoded at the normal rate, the frames B3 and B4 continue to be displayed until the stream A is at the transition point. In some implementations, although there may be a very short time period during which the user may see the lower resolution stream being displayed during the normal play, such a difference is small enough not to be noticeable by human eyes given the time period is very short. Continuing with the example, when the stream A is at the transition point, the decoder 120 starts to decode the stream A at the normal rate, and the stream A and the stream B can be synchronized with each other. Once the decoded frames from the stream A are available, for example, the display engine can switch to display the stream A. In these implementations, by switching to decode and display the stream A at/after a transition point, the transition from displaying stream B to displaying stream A can be seamlessly. It should be understood that the discussion above with respect to starting to decode a stream (e.g., stream A) means that the decoder can effectively start to decode the frames (i.e., the decoder can produce decoded frames). In some implementations, as noted above, when the command to stop the trick mode operation and resume the normal play is received, the media server 110 starts to feed the stream A into the decoder 120 which can identify whether stream A is at a transition point. In these implementations, the decoder 120 can effectively produce decoded frames for the stream A when a transition point in stream A is identified.

Although the foregoing describes implementations where two video streams are decoded by two decoders, the disclosure is not limited to that. For example, in some implementations, there can be three or more video streams each is decoded by a decoder as described herein above. In other implementations, there can be only one decoder available for decoding two or more video streams. These implementations are described herein below in relation to FIGS. 4A and 4B. Furthermore, the operations described herein above are not limited to fast forward, or 2× fast forward, or trick mode operations. For example, 1.5× fast forward, 3× fast forward, or rewind operations can be applicable. In some implementations, any operations where the decoder has to run at different (e.g., faster) rates can be applicable.

Figure 4A:
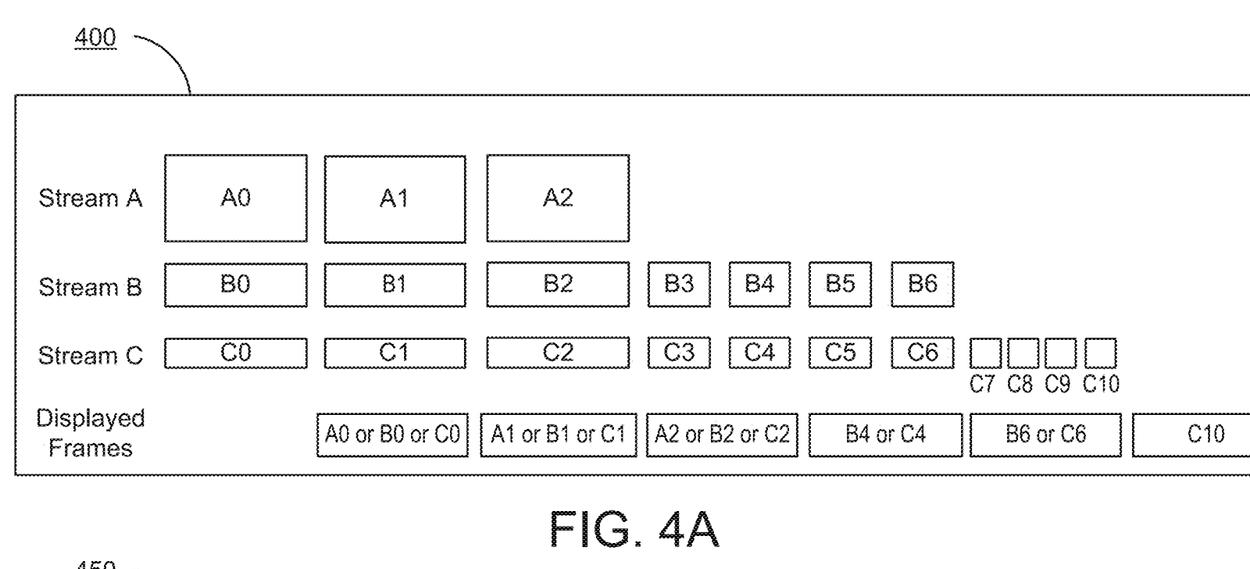
FIG. 4A is a block diagram depicting an example operation of transitioning into a trick mode operation with three video streams, according to an illustrative implementation.

FIG. 4A is a block diagram depicting an example operation 400 of transitioning into a trick mode operation with three video streams. In some implementations, as shown in FIG. 4A, three video streams can be decoded by three decoders simultaneously during the normal play. For example, a stream A can be a 2160p resolution video stream, a stream B can be a 1080p video stream, and a stream C can be a 480p video stream. During normal play, the display engine can select frames in any of streams A, B, or C for display. Continuing with the example in FIG. 4A, when a 2× fast forward command is received, the media server 110 stops decoding the stream A, changes to decode the streams B and C at the 2× fast forward rate, and presents frames from the stream B (or stream C) for display. When a 4× fast forward command is received, the media server 110 stops decoding the stream B and changes to decode the stream C at the 4× fast forward rate. In this example, now only the stream C is being decoded and the media server 110 switches to display frames from the stream C.

Figure 4B:
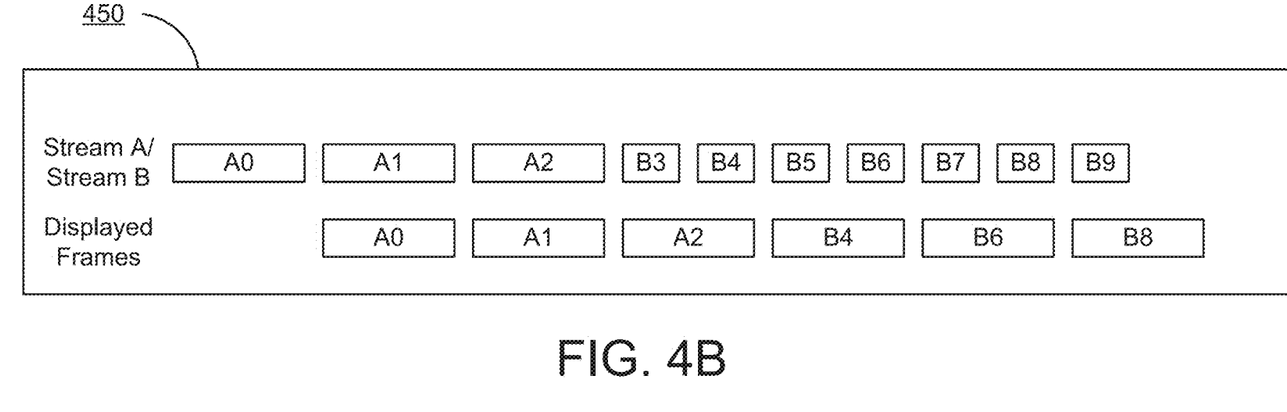
FIG. 4B is a block diagram depicting an example operation of transitioning into a trick mode operation using one decoder, according to an illustrative implementation.

FIG. 4B is a block diagram depicting an example operation 450 of transitioning into a trick mode operation using one decoder. In some implementations, one decoder decodes two or more video streams. Referring to FIG. 4B, during the normal play, a decoder (e.g., decoder 120) decodes stream A at a normal play rate. When a fast forward command is received, for example, the decoder stops decoding the stream A and starts to decode the stream B at the fast forward rate. Subsequent to frames from stream B become available, the display engine switches to display the stream B.

Figure 5:
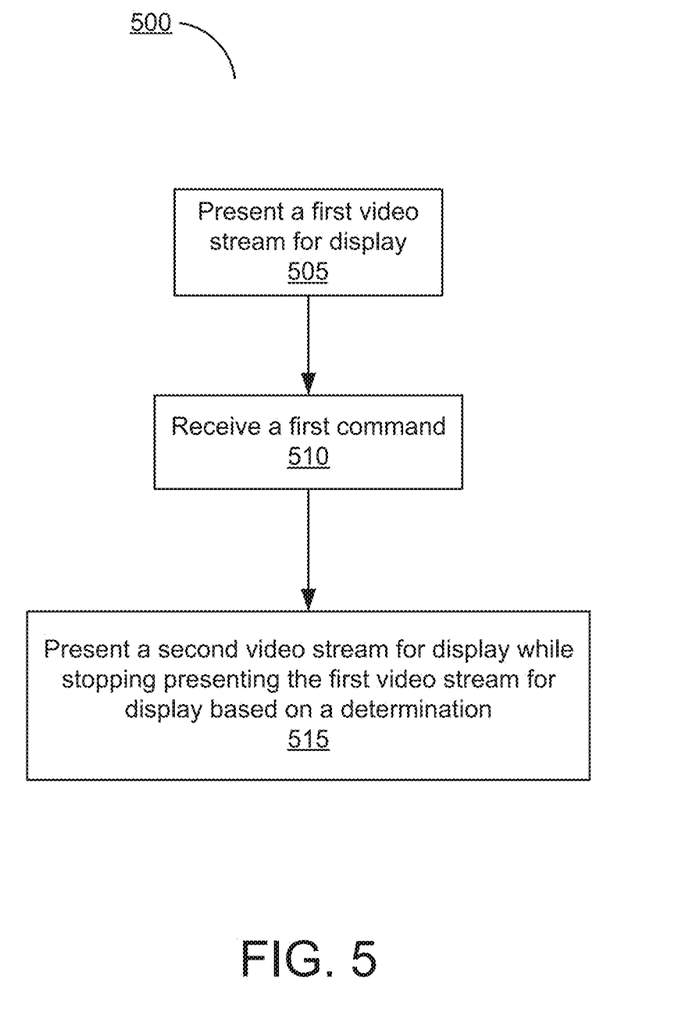
FIG. 5 is a flow diagram depicting an example flow of performing trick mode operation, according to an illustrative implementation.

FIG. 5 is a flow diagram depicting an example flow 500 of performing trick mode operation. In some implementations, the flow 500 can present a first video stream for display (operation 505). The first video stream has a first level of a video characteristic. For example, a media server can present a first video stream having a 2160p resolution for display. In some implementations, the flow 500 can receive a first command (operation 510). For example, a media server can receive a trick mode command, such as a fast forward command, from a remote control device operated by a user. In some implementations, in response to receiving the first command, the flow 500 can present a second video stream for display while stopping presenting the first video stream for display based on a determination (operation 515). The second video stream can be directed to the same video content as the first video stream and can have a second level of the video characteristic which is different from the first level of the video characteristic. For example, the second video stream can have a 1080p resolution.

Figure 6:
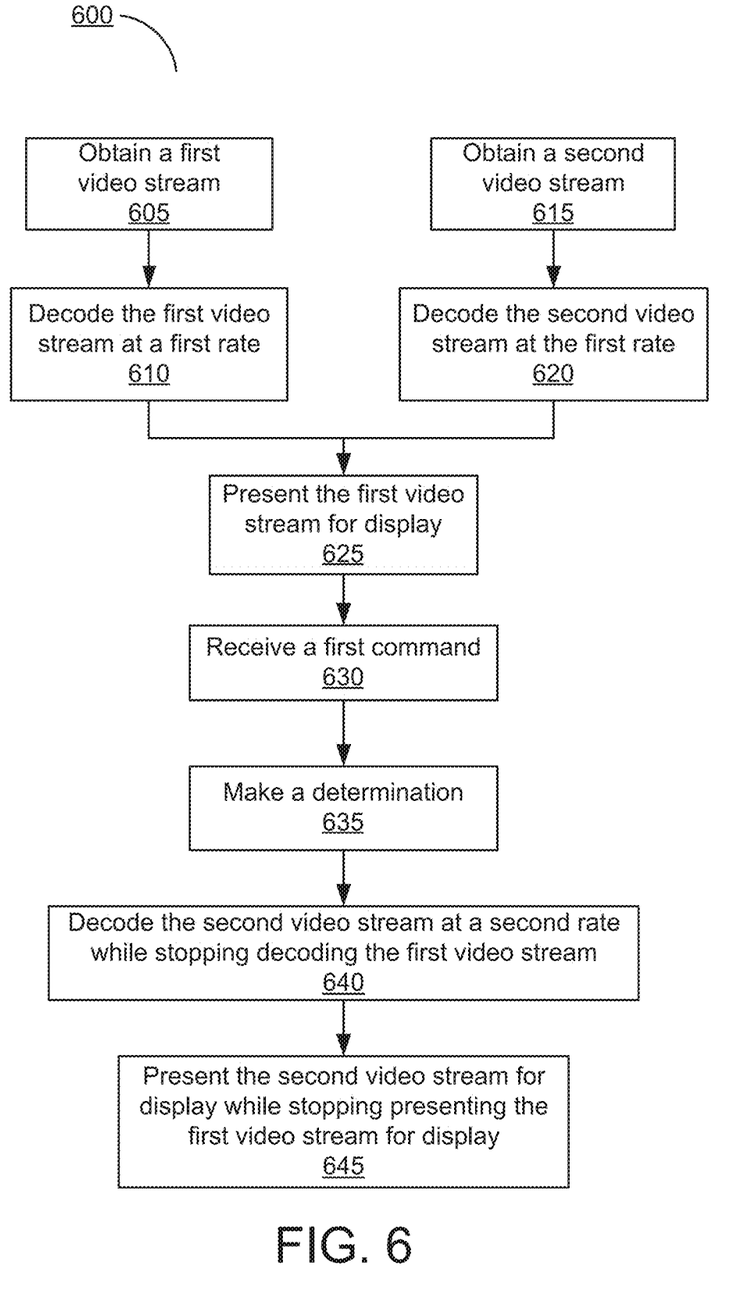
FIG. 6 is a flow diagram depicting an example flow of performing trick mode operation, according to an illustrative implementation.

FIG. 6 is a flow diagram depicting an example flow 600 of performing trick mode operation. In brief overview, the flow 600 can obtain a first video stream (operation 605) and a second video stream (operation 615). The flow 600 can simultaneously decode the first video stream at a first rate (operation 610) and decode the second video stream at the first rate (operation 620). The flow 600 can present the first video stream for display (operation 625). The flow 600 can receive a first command (operation 630), for example, a fast forward command. The flow 600 can make a determination (operation 635). The flow 600 can decode the second video stream at a second rate while stopping decoding the first video stream (operation 640) and present the second video stream for display while stopping presenting the first video stream for display (operation 645) based on the determination (operation 635).

In further detail, the flow 600 can obtain a first video stream (operation 605) and a second video stream (operation 615). For example, a media server can obtain the first video stream and the second video stream. In some implementations, the media server can receive the first video stream and the second video stream from a source (e.g., via simulcast). The source can be a service provider, a head end, a video camera, or a storage device. The first and second video streams can be directed to the same video content but having different levels of a video characteristic. The video characteristic can include at least one of a resolution, a frame rate, a bit precision, a bit rate, or a chroma subsampling. The first and second video streams can be received via a cable network, a satellite, an internet, a cellular network, or other networks.

In some implementations, the media server can generate additional video streams from a received video stream. For example, a transcoder of the media server can generate one or more additional video streams based on a video stream received from a source. In some implementations, the transcoder can generate additional video streams when the received video stream enters the media server. For instance, the received video stream can be a 4K UHD (2160p) video stream. The transcoder can take the 2160p video stream as input, decode it, and re-encode it to generate a lower resolution (e.g., 1080p, 720p, etc.) video stream. In this example, the video content between the 2160p video stream and the 1080p or 720p video stream are the same, but the resolutions are different. In another example, the transcoder can take a video stream with other video characteristics (e.g., frame rate, bit precision, bit rate, chroma subsampling) and generate one or more video streams having lower levels of the video characteristics (e.g., lower frame rate, lower bit precision).

The flow 600 can simultaneously decode the first video stream at a first rate (operation 610) and decode the second video stream at the first rate (operation 620). For example, a first decoder on the media server can decode the first video stream and a second decoder on the media server can decode the second video stream. In some implementations, each of the first and second video streams can be decoded by a dedicated hardware video decoder. In other implementations, each of the first and second video streams can be decoded by a separate decoding operation running on the same hardware video decoder. In some implementations, a processor of the media server can execute instructions stored in a storage or a non-transitory computer-readable medium to perform decoding operations.

In some implementations, during a normal play, the first decoder can decode the first video stream at the normal play rate and the second decoder can decode the second video stream at the normal play at the same time. In some implementations, the media server monitors the buffers storing the first and second video streams to keep the two streams synchronized with each other. For example, the media server can check the presentation timestamps (PTS) of the corresponding frames in the two streams to see if they match or correspond with each other. In some implementations, the media server can synchronize the two streams if the streams do not synchronize with each other. In some implementations, the decoded frames in the first and second video streams do not have to be one-to-one synchronous with each other. In these implementations, as long as the corresponding frames in the two streams are close to each other, the transition into the trick mode can be seamless.

The flow 600 can present the first video stream for display (operation 625). For example, a display engine of the media server can present the decoded first video stream for display. In some implementations, the first video stream can have a first level of a video characteristic (e.g., 2160p resolution). For example, the display engine can select frames of the first video stream (e.g., a 2160p resolution stream) stored in a first frame buffer for display because the first video stream has a better video quality. The flow 600 can receive a first command (operation 630). For example, the media server can receive a trick mode command from a remote control device operated by a user. The trick mode command can include a fast forward command or a rewind command.

The flow 600 can make a determination (operation 635). In some implementations, the media server can determine that decoding the first video stream requires more decoder power than decoding the second video stream using a comparison between the first level of the video characteristic and the second level of the video characteristic. For example, the determination can be based on a comparison between the resolution, the frame rate, the bit precision, the bit rate, and/or the chroma subsampling of the two video streams. In some implementations, the determination can be based on the capacity of the decoders and/or other hardware within the media server 110. For example, the media server can determine that decoding the first video stream (e.g., a 2160p resolution stream) may require more decoder power or higher decoder performance than decoding the second video stream (e.g., a 1080p resolution stream). For example, the media server can determine that the decoder decoding the first video stream (e.g., a 2160p resolution stream) may not be kept up during a certain trick mode operation (e.g., a fast forward operation). For example, the media server can determine that using the first video stream (e.g., a 2160p resolution stream) during a trick mode operation may not be efficient or economic even if the decoder can keep up with the faster speed of operation.

The flow 600 can change to decode the second video stream from the first rate to a second rate while stopping decoding the first video stream (operation 640) in response to receiving the first command. The second rate is higher than the first rate. For example, the first rate can be the normal play rate and the second rate can be a fast forward rate. For example, in response to receiving a fast forward command, the media server can decode the second video stream directed to the same video content as the first video stream at the second rate (e.g., the fast forward rate) while stopping decoding the first video stream based on the determination (operation 235) determined using the first level of the video characteristic (e.g., 2160p resolution) and the second level of the video characteristic (e.g., 1080p resolution).

The flow 600 can present the second video stream for display while stopping presenting the first video stream for display (operation 645) in response to receiving the first command. For example, in response to receiving a fast forward command, the media server can present the second video stream directed to the same video content as the first video stream for display while stopping presenting the first video stream for display based on the determination (operation 235) determined using the first level of the video characteristic (e.g., 2160p resolution) and the second level of the video characteristic (e.g., 1080p resolution).

Figure 7:
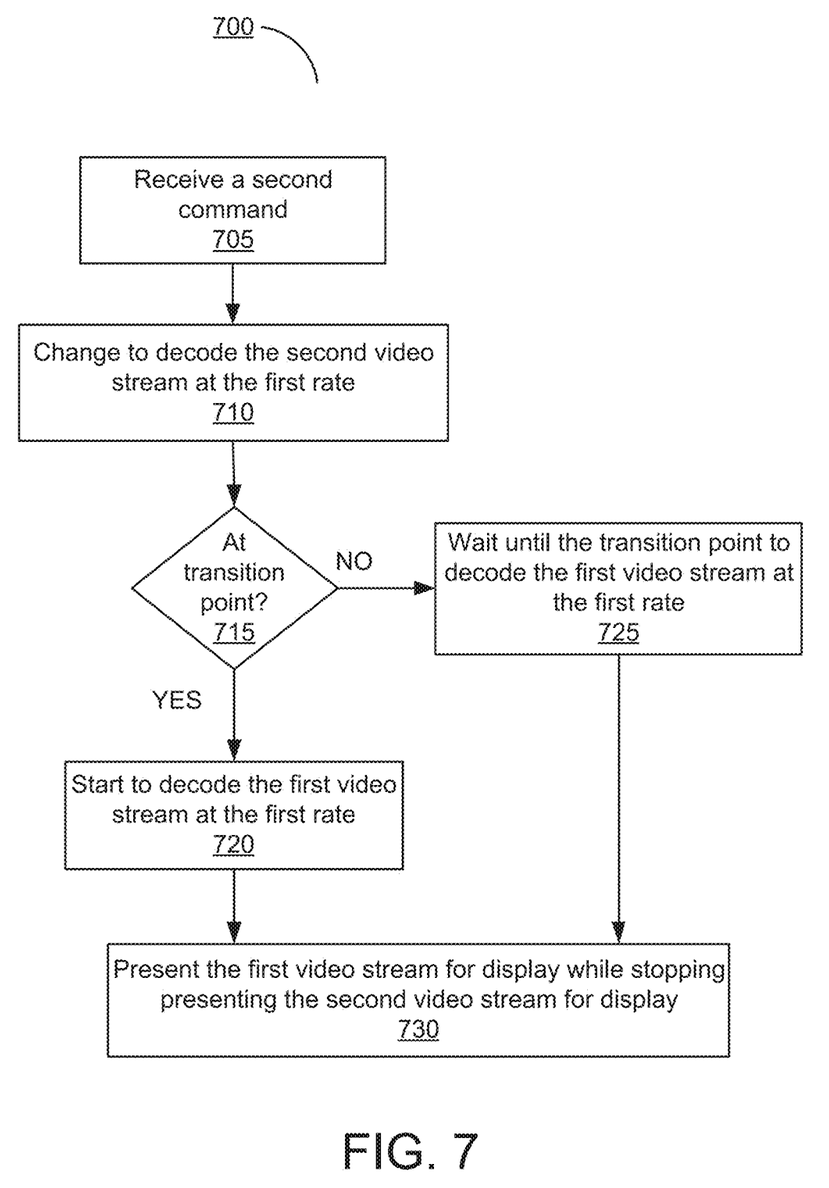
FIG. 7 is a flow diagram depicting an example flow of performing trick mode operation, according to an illustrative implementation.

FIG. 7 is a flow diagram depicting an example flow 700 of performing trick mode operation. In brief overview, the flow 700 can receive a second command (operation 705), for example a command to stop a fast forward operation and resume the normal play. The flow 700 can change to decode the second video stream from the second rate to the first rate (operation 710). The flow 700 can determine whether the first video stream is at a transition point (operation 715). The flow 700, in response to determining that the first video stream is at the transition point, can start to decode the first video stream at the first rate (operation 720). The flow 700, in response to determining that the first video stream is not at the transition point, can wait until the first video stream is at the transition point to decode the first video stream at the first rate (operation 725). The flow 700 can present the first video stream for display while stopping presenting the second video stream for display (operation 730) after the transition point is reached and the media server starts to decode the first video stream. In some implementations, if two decoders are available, overlapping the decoding of the two streams at the first rate may prevent gaps on the display due to latency of the decoders.

In further detail, the flow 700 can receive a second command (operation 705). For example, the media server can receive a command to stop the trick mode operation (e.g., the fast forward operation) and resume the normal play from a remote control or other devices operated by a user. The flow 700, in response to receiving the second command, can change to decode the second video stream from the second rate to the first rate (operation 710). For example, in response to receiving the command to stop the fast forward operation and resume the normal play, the media server can change to decode the second video stream from the fast forward rate to the normal play rate.

The flow 700 can determine whether the first video stream is at a transition point (operation 715) in response to receiving the second command. In some implementations, when the second command is received, the media server starts to feed the first video stream into the decoder which can identify whether the first video stream is at a transition point. If a transition point is identified, the media server determines that the first video stream is at a transition point. A transition point can be any point in the video stream where the decoder can effectively start to decode the frames. For example, a transition point can be an I-frame (intra-coded picture) or a reference frame in a video stream or in a group of pictures (GOP) within the video stream.

The flow 700, in response to that the first video stream is at the transition point, can start to decode the first video stream at the first rate (operation 720). For example, the media server can start to decode the first video stream at the normal play rate in response to that the first video stream is at the transition point.

The flow 700, in response to that the first video stream is not at the transition point, can wait until the first video stream is at the transition point to decode the first video stream at the first rate (operation 725). For example, the media server can wait until the first video stream is at the transition point to start to decode the first video stream at the normal play rate in response to that the first video stream is not at the transition point.

The flow 700 can present the first video stream for display while stopping presenting the second video stream for display (operation 730). For example, the media server can stop presenting the second video stream for display and switch to display the first video stream subsequent to the transition point is reached and the first video stream is being decoded. In some implementations, the media server, in response to determining that the first video stream is at the transition point, can present the first video stream for display while stopping presenting the second video stream for display. In some implementations, the media server, in response to determining that the first video stream is not at the transition point, can present the second video stream for display until the first video stream is at the transition point. The media server, in response to the first video stream reaches the transition point, can present the first video stream for display while stopping presenting the second video stream for display.

Figure 8A:
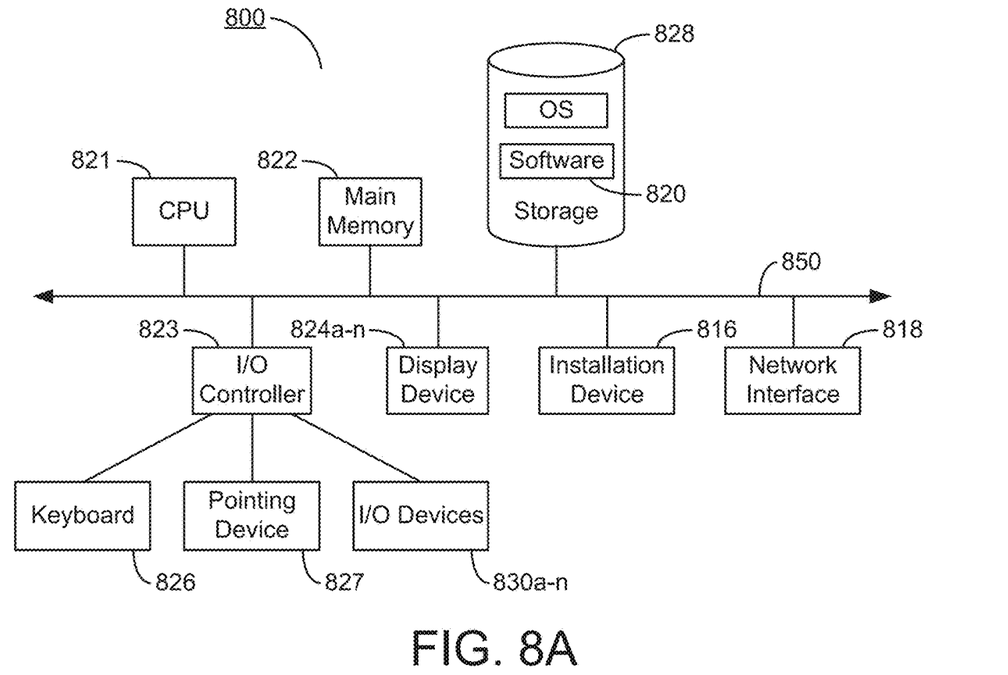
FIGS. 8A and 8B are block diagrams depicting implementations of computing devices useful in connection with the methods and systems described herein.
Figure 8B:
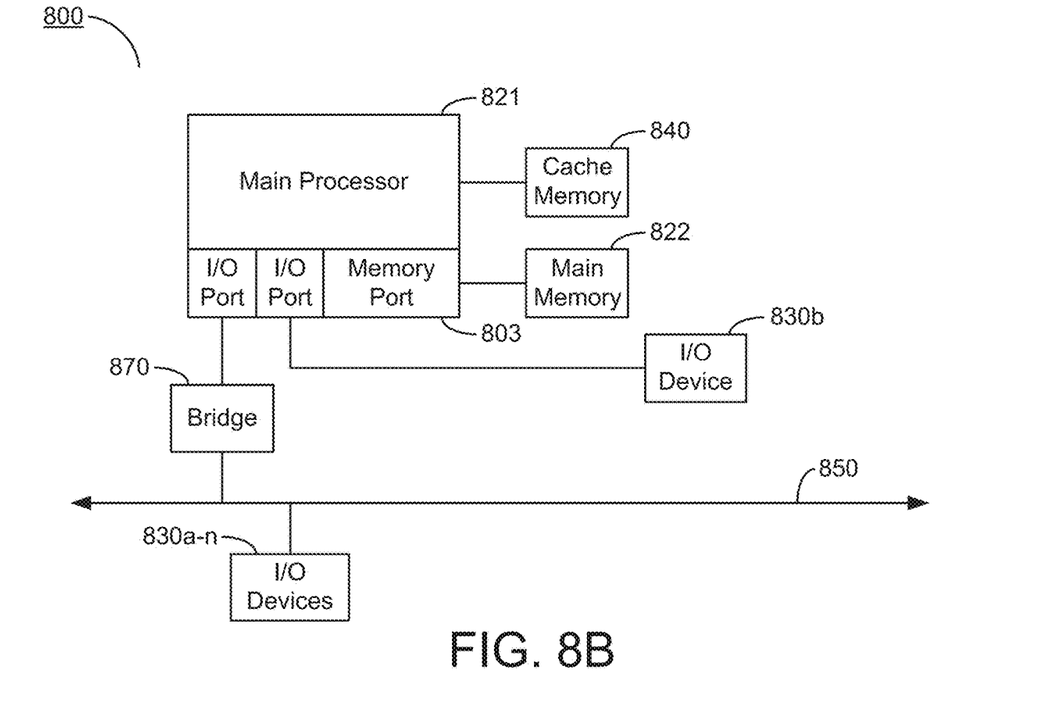

FIGS. 8A and 8B depict block diagrams of a computing device 800 useful for practicing an implementation of the media server 110 and/or the client device 160 as shown in FIG. 1. As shown in FIGS. 8A and 8B, each computing device 800 includes a central processing unit 821, and a main memory unit 822. As shown in FIG. 8A, a computing device 800 may include a storage device 828, an installation device 816, a network interface 818, an I/O controller 823, display devices 824a-824n, a keyboard 826 and a pointing device 827, such as a mouse. The storage device 828 may include, without limitation, an operating system and/or software. As shown in FIG. 8B, each computing device 800 may also include additional optional elements, such as a memory port 803, a bridge 870, one or more input/output devices 830a-830n (generally referred to using reference numeral 830), and a cache memory 840 in communication with the central processing unit 821.

The central processing unit 821 is any logic circuitry that responds to and processes instructions fetched from the main memory unit 822. In many implementations, the central processing unit 821 is provided by a microprocessor unit, such as: those manufactured by Intel Corporation of Mountain View, California; those manufactured by International Business Machines of White Plains, New York; those manufactured by Advanced Micro Devices of Sunnyvale, California; or those manufactured by Advanced RISC Machines (ARM). The computing device 800 may be based on any of these processors, or any other processors capable of operating as described herein.

Main memory unit 822 may be one or more memory chips capable of storing data and allowing any storage location to be directly accessed by the microprocessor 821, such as any type or variant of Static random access memory (SRAM), Dynamic random access memory (DRAM), Ferroelectric RAM (FRAM), NAND Flash, NOR Flash and Solid State Drives (SSD). The main memory 822 may be based on any of the above described memory chips, or any other available memory chips capable of operating as described herein. In the implementation shown in FIG. 8A, the processor 821 communicates with main memory 822 via a system bus 850 (described in more detail below). FIG. 8B depicts an implementation of a computing device 800 in which the processor communicates directly with main memory 822 via a memory port 803. For example, in FIG. 8B the main memory 822 may be DRDRAM.

FIG. 8B depicts an implementation in which the main processor 821 communicates directly with cache memory 840 via a secondary bus, sometimes referred to as a backside bus. In other implementations, the main processor 821 communicates with cache memory 840 using the system bus 850. Cache memory 840 typically has a faster response time than main memory 822 and is provided by, for example, SRAM, BSRAM, or EDRAM. In the implementation shown in FIG. 8B, the processor 821 communicates with various I/O devices 830 via a local system bus 850. Various buses may be used to connect the central processing unit 821 to any of the I/O devices 830, for example, a VESA VL bus, an ISA bus, an EISA bus, a MicroChannel Architecture (MCA) bus, a PCI bus, a PCI-X bus, a PCI-Express bus, or a NuBus. For implementations in which the I/O device is a video display 824, the processor 821 may use an Advanced Graphics Port (AGP) to communicate with the display 824. FIG. 8B depicts an implementation of a computer 800 in which the main processor 821 may communicate directly with I/O device 830b, for example via HYPERTRANSPORT, RAPIDIO, or INFINIBAND communications technology. FIG. 8B also depicts an implementation in which local busses and direct communication are mixed: the processor 821 communicates with I/O device 830a using a local interconnect bus while communicating with I/O device 830b directly.

A wide variety of I/O devices 830a-830n may be present in the computing device 800. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 823 as shown in FIG. 8A. The I/O controller may control one or more I/O devices such as a keyboard 826 and a pointing device 827, e.g., a mouse or optical pen. Furthermore, an I/O device may also provide storage and/or an installation medium 816 for the computing device 800. In still other implementations, the computing device 800 may provide USB connections (not shown) to receive handheld USB storage devices such as the USB Flash Drive line of devices manufactured by Twintech Industry, Inc. of Los Alamitos, California.

Referring again to FIG. 8A, the computing device 800 may support any suitable installation device 816, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 800 may further include a storage device, such as one or more hard disk drives or redundant arrays of independent disks, for storing an operating system and other related software, and for storing application software programs such as any program or software 820 for implementing (e.g., configured and/or designed for) the systems and methods described herein. Optionally, any of the installation devices 816 could also be used as the storage device. Additionally, the operating system and the software can be run from a bootable medium.

Furthermore, the computing device 800 may include a network interface 818 to interface to the network 804 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one implementation, the computing device 800 communicates with other computing devices 800' via any type and/or form of gateway or tunneling protocol such as Secure Socket Layer (SSL) or Transport Layer Security (TLS). The network interface 818 may include a built-in network adapter, network interface card, PCMCIA network card, card bus network adapter, wireless network adapter, USB network adapter, modem or any other device suitable for interfacing the computing device 800 to any type of network capable of communication and performing the operations described herein.

In some implementations, the computing device 800 may include or be connected to one or more display devices 824a-824n. As such, any of the I/O devices 830a-830n and/or the I/O controller 823 may include any type and/or form of suitable hardware, software, or combination of hardware and software to support, enable or provide for the connection and use of the display device(s) 824a-824n by the computing device 800. For example, the computing device 800 may include any type and/or form of video adapter, video card, driver, and/or library to interface, communicate, connect or otherwise use the display device(s) 824a-824n. In one implementation, a video adapter may include multiple connectors to interface to the display device(s) 824a-824n. In other implementations, the computing device 800 may include multiple video adapters, with each video adapter connected to the display device(s) 824a-824n. In some implementations, any portion of the operating system of the computing device 800 may be configured for using multiple displays 824a-824n. One ordinarily skilled in the art will recognize and appreciate the various ways and implementations that a computing device 800 may be configured to have one or more display devices 824a-824n.

In further implementations, an I/O device 830 may be a bridge between the system bus 850 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific implementation, method, and examples herein. The present methods and systems should therefore not be limited by the above described implementations, methods, and examples, but by all implementations and methods within the scope and spirit of the disclosure.

The invention claimed is:

1. A system, comprising:
a circuit configured to:
decode a first video stream at a first rate simultaneously with decoding a second video stream at a second rate different from the first rate;
one or more frame buffers configured to store decoded video frames generated from the circuit;
a processor configured to:
determine that decoding the first video stream at the first rate consumes more decoding power or decoding performance than decoding the second video stream at the second rate; and
in response to the determination, decode the second video stream at the second rate while stopping decoding of the first video stream,
wherein a display engine is configured to select decoded video frames of the second video stream from the one or more frame buffers for display via a connection to a client device.

2. The system of claim 1, wherein processing the first video stream and the second video stream each comprise decoding the corresponding video stream.

3. The system of claim 1, wherein decoding the second video stream at the second rate comprises changing a decode rate of the system from the first rate to the second rate.

4. The system of claim 1, wherein the second rate is higher than the first rate.

5. The system of claim 1, wherein the first video stream has a first level of a video characteristic and the second video stream has a second level of the video characteristic, the first level of the video characteristic different from the second level of the video characteristic.

6. The system of claim 5, wherein the determination that decoding the first video stream at the first rate consumes more decoding power than decoding the second video stream is based at least in part on a comparison between the first level of the video characteristic and the second level of the video characteristic.

7. The system of claim 5, wherein the video characteristic comprises at least one of a resolution, a frame rate, a bit precision, a bit rate, or a chroma subsampling; and
wherein the processor and/or circuit are further configured to receive a trick mode command including at least one of a fast forward command or a rewind command.

8. The system of claim 1, wherein the processor and/or circuit are further configured to receive a command to decode the second video stream at the second rate while stopping processing of the first video stream.

9. The system of claim 1, wherein the first video stream and the second video stream are directed to a same video content.

10. The system of claim 1, wherein decoding the first video stream at the first rate comprises outputting, by the processor and/or circuit, the first video stream at a first playback rate; and
wherein decoding the second video stream at the second rate comprises outputting, by the processor and/or circuit, the second video stream at a second playback rate.

11. The system of claim 1, further comprising a transcoder configured to generate one of the first video stream or the second video stream from a video stream received as input.

12. A method, comprising:
decoding, by one or more decoders of a device, a first video stream at a first rate simultaneously with a second video stream at a second rate different from the first rate;
storing, by the device, decoded video frames generated by the one or more decoders to one or more frame buffers;
determining, by a processor of the device, that decoding the first video stream at the first rate consumes greater power or performance of the one or more decoders than decoding the second video stream;
in response to the determination, continue decoding, by the device, the second video stream at the second rate while stopping decoding of the first video stream; and
selecting, by a display engine of the device, decoded video frames of the second video stream for display via a connection to another device.

13. The method of claim 12, wherein decoding the first video stream and the second video stream each comprise decoding the corresponding video stream.

14. The method of claim 12, wherein decoding the second video stream at the second rate comprises changing a decode rate of the device from the first rate to the second rate.

15. The method of claim 12, wherein the second rate is higher than the first rate.

16. The method of claim 12, wherein the first video stream has a first level of a video characteristic and the second video stream has a second level of the video characteristic, the first level of the video characteristic different from the second level of the video characteristic.

17. The method of claim 16, wherein the determination that decoding the first video stream at the first rate consumes greater power or performance of the one or more decoders than decoding the second video stream is based at least in part on a comparison between the first level of the video characteristic and the second level of the video characteristic.

18. The method of claim 16, wherein the video characteristic comprises at least one of a resolution, a frame rate, a bit precision, a bit rate, or a chroma subsampling, and further comprising receiving, by the device, a trick mode command including at least one of a fast forward command or a rewind command.

19. The method of claim 12, further comprising receiving, by the device, a command to process the second video stream at the second rate while stopping processing of the first video stream.

20. The method of claim 12, wherein the first video stream and the second video stream are directed to a same video content.

21. The method of claim 12, wherein decoding the first video stream at the first rate comprises outputting, by the device, the first video stream at a first playback rate; and
wherein decoding the second video stream at the second rate comprises outputting, by the device, the second video stream at a second playback rate.

22. The method of claim 12, further comprising receiving, by a transcoder of the device, a video stream and encoding one of the first video stream or the second video stream.

23. A circuit, comprising:
- a decoder configured to decode a first video stream at a first rate and a second video stream at a second rate, different from the first rate generate decoded video frames and store the decoded video frames to one or more frame buffers;
- a processor configured to determine that decoding the first video stream at the first rate consumes more decoder resources than decoding the second video stream, simultaneously with the first video stream, at the second rate; and
- wherein the decoder is further configured to decode the second video stream at the second rate while stopping decoding of the first video stream in response to the determination; and
- a display engine configured to select decoded video frames from the one or more frame buffers for display via a connection to a client device.

24. The circuit of claim 23, wherein decoding the first video stream and the second video stream each comprise decoding the corresponding video stream.

25. The circuit of claim 23, wherein decoding the first video stream at the first rate comprises outputting the first video stream at a first playback rate; and wherein decoding the second video stream at the second rate comprises outputting the second video stream at a second playback rate.

26. The circuit of claim 23, wherein the decoder resources comprise one or more of decoder performance or decoder power.

* * * * *